United States Patent [19]
Sloo

[11] Patent Number: 5,895,450
[45] Date of Patent: Apr. 20, 1999

[54] METHOD AND APPARATUS FOR HANDLING COMPLAINTS

[76] Inventor: Marshall A. Sloo, 2817 Irving Ave., S., Minneapolis, Minn. 55408

[21] Appl. No.: 08/892,600

[22] Filed: Jul. 14, 1997

Related U.S. Application Data

[63] Continuation-in-part of application No. 08/392,053, Feb. 22, 1995, Pat. No. 5,668,953.

[51] Int. Cl.$^6$ .................................................. G06F 19/00
[52] U.S. Cl. .............................. 705/1; 345/331; 705/10
[58] Field of Search ........................ 705/1, 10; 345/331

[56] References Cited

U.S. PATENT DOCUMENTS 5,495,412  2/1996  Thiessen ..................................... 705/1

OTHER PUBLICATIONS

Unknown author, Better Business Bureau Web Site, http://www.bbb.org., dated Mar. 23, 1997.
Unknown author, National Consumer Complaint Center Web Site, http://seamless.com/nccc/cb-intro.html., dated Mar. 23, 1997.

Anonymous, "Get it Straight From the Customer", Success, v40,pp.:41, dated Oct. 1993.

Mitchell, "Handling Consumer Complaint Information: Why and How", Logistics Information Management, v5n3, pp.: 20-36, 1993.

*Primary Examiner*—Eric W. Stamber
*Assistant Examiner*—Penny Caudle
*Attorney, Agent, or Firm*—Hovey, Williams, Timmons & Collins

[57] ABSTRACT

A computer program and a programmed apparatus (10) for automatically handling and resolving user complaints against subjects is disclosed. The program includes a routine for directing the apparatus to receive a complaint from a complainant against a subject, a routine for directing the apparatus to receive from the subject a response to the complaint, a routine to direct the apparatus to store the complaint and response in a data record, and a routine for negotiating a settlement of the complaint.

19 Claims, 5 Drawing Sheets

METHOD AND APPARATUS FOR HANDLING COMPLAINTS

RELATED APPLICATION

This application is a continuation-in-part of application Ser. No. 08/392,053 entitled METHOD AND APPARATUS FOR HANDLING A COMPLAINT, filed Feb. 22, 1995, now U.S. Pat. No. 5,668,953.

BACKGROUND OF THE INVENTION

1. Field of the Invention

The present invention relates to a method, computer program, and apparatus for automatically handling, processing and resolving complaints.

2. Description of the Prior Art

When consumers receive unsatisfactory goods or services, or are involved in a dispute with a vendor or other subject, they typically must lodge complaints directly to the subject by filling out a complaint form or by directly speaking to the subject. Although this method of complaint resolution sometimes resolves the particular dispute at issue, it does not inform other consumers about the complaint. Additionally, some consumers do not like to file complaints face-to-face due to inconvenience or embarrassment.

Government and non-profit consumer organizations such as the Better Business Bureau provide services that inform consumers about complaints lodged against subjects by compiling complaints filed against different companies and then allowing consumers to check the reputation of a particular subject by requesting a report listing the complaints lodged against the subject. Unfortunately, these services don't encourage the complainant and the subject to resolve a complaint because the subject is not notified directly of the complaint and cannot respond to the complaint. Additionally, these services do not allow the subject to publicly respond to the complaint and therefore endanger the subject's reputation when baseless complaints are filed. Moreover, these consumer complaint services are typically local or regional and each has different methods for resolving complaints, resulting in inconsistent handling of consumer complaints.

Another limitation of prior art methods of handling user complaints is that they do not encourage good conduct and cooperation between complainants and subjects while the parties attempt to resolve the dispute. Particularly, once a complaint has been filed by conventional methods, neither party is rewarded for good conduct while attempting to resolve the complaint nor punished for bad conduct.

SUMMARY OF THE INVENTION

The present invention overcomes the problems outlined above and provides a distinct advance in the art of complaint handling methods. More particularly, the present invention provides a method and apparatus for handling complaints that allows complainants to lodge anonymous complaints against subjects, informs the subjects of the complaints, permits the subjects to respond to the complaints, encourages settlements of the complaints and holds the parties to the complaints accountable for their conduct while attempting to resolve the complaints.

The method of the present invention is preferably implemented with a programmed central computer, a plurality of access terminals, and a communications network coupling the central computer with the access terminals. The central computer is programmed to receive complaints and responses, store the complaints and responses in individual data records, and negotiate settlements to the complaints by several means described in the Detailed Description below. Once the disputes are resolved, the settlements or judgments are stored along with their respective complaints and responses in the data records.

The central computer is also programmed to provide public access to the data records to permit viewing of the corresponding complaints, responses, and settlements for allowing other users to gauge the conduct of the subjects and to encourage the subjects to respond to the complaints in a timely and satisfactory manner. Moreover, the central computer is programmed to monitor and rate the conduct and performance of both the complainants and the subjects during the course of the disputes. The ratings can be used to affect the outcome of the disputes and for other purposes to hold the parties accountable for their conduct during the attempted resolution of the disputes to encourage good conduct and cooperation between the parties during the course of the disputes.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
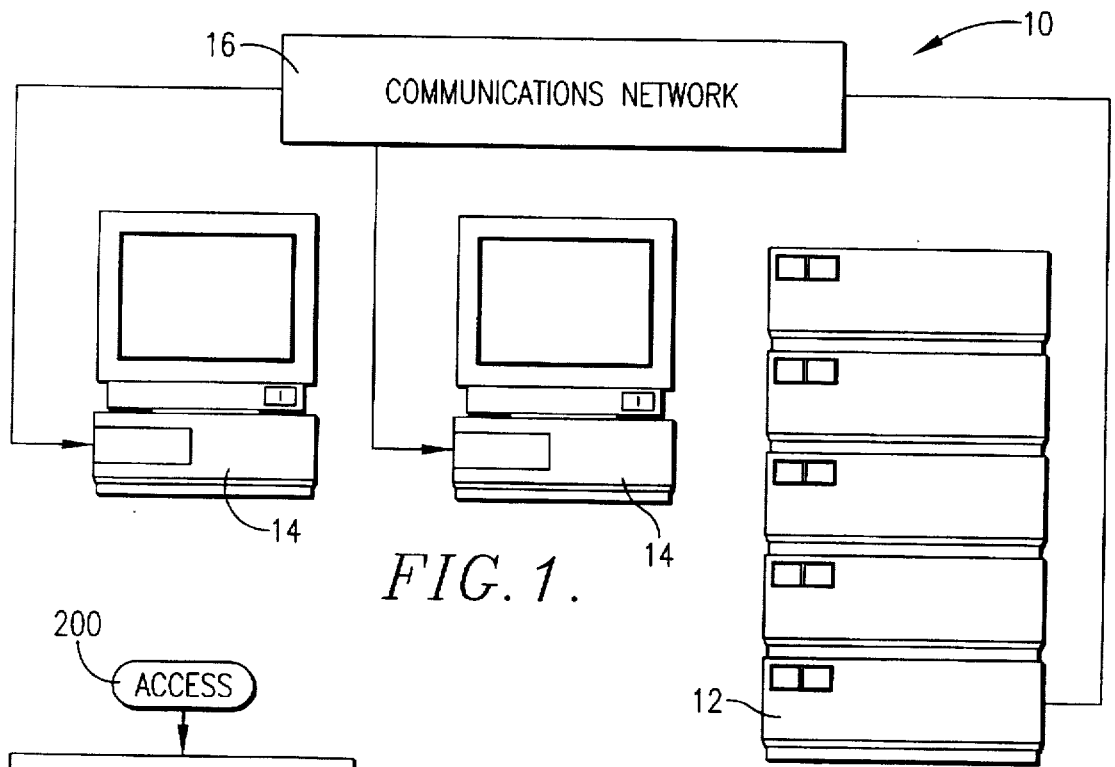
FIG. 1 is a schematic representation of a complaint handling apparatus constructed in accordance with a preferred embodiment of the present invention.

FIG. 1 illustrates a complaint handling apparatus 10 constructed in accordance with a preferred embodiment of the invention and FIGS. 2–9 illustrate the steps performed while implementing the method of the invention. In general, the apparatus receives complaints, notifies the subjects of the complaints, receives responses from the subjects, stores the complaints and associated responses in individual data records, and negotiates settlements by several means described below. The apparatus also provides public access to portions of the data records and monitors and rates the performance of the parties to the disputes to hold the parties accountable for their conduct during the attempted resolution of the disputes.

The users of the apparatus who file complaints, who are referred to as "users" or "complainants" herein, may include individuals, businesses, organizations, or any other entities. The complaints may relate to goods, classes of goods, services, and/or the vendors, individuals, organizations, or any object. The subjects of the complaints, who are referred to as "subjects" herein, may be individuals, manufacturers, distributors, wholesalers, retailers or any other responsible persons or entities.

In more detail, the preferred complaint handling apparatus 10 broadly includes a central computer 12 and a plurality of access terminals 14 coupled with the central computer by a communications network 16. The central computer is preferably a conventional file-server microcomputer such as those manufactured by Digital Equipment Corporation. The central computer includes conventional memory, input and output ports, and a modem, and is operable for receiving, storing and retrieving data such as complaints, responses to the complaints, and other information relating to the complaints.

The access terminals 14 receive complaints and responses from the users, deliver them to the central computer 12, and receive transmissions from the central computer. The access terminals are preferably personal computers such as IBM compatible microcomputers containing Intel Pentium type microprocessors but they may also be "dumb" terminals with communication capabilities. Each access terminal includes conventional memory, input and output ports, a modem and software for communicating with and interpreting the data sent from the central computer. Those skilled in the art will appreciate that any number of access terminals may be used with the present invention.

The communications network 16 is preferably a conventional telecommunications network including a plurality of switches connected to corresponding local exchange carriers. The network may also be a local area network, wide area network, wireless network, voice network, or any other type of network operable for coupling the access terminals 14 to the central computer 12. The private communications transmitted over the communications network may be encrypted or otherwise protected using available technology.

Those skilled in the art will appreciate that the method of the present invention may be implemented with virtually all types of hardware and that the preferred central computer 12, access terminals 14 and communications network 16 are described merely to set forth one best mode of the invention.

The method of the present invention is preferably implemented with a computer program that controls the operation of the central computer 12. The computer program may be stored in the read-only-memory (ROM) or hard drive memory of the central computer or on conventional external disks for transfer to the memory of the central computer. The data records containing the complaints, responses, and other information related to the complaints are preferably stored in the hard drive memory of the central computer.

The computer program interface is preferably written in a Standard Generalized Mark-up Language (SGML) such as Hypertext language. The mark-up language cooperates with a standard server language such as Common Gateway Interface (CGI) or Practical Extraction and Report Language (PERL) for handling the various operating functions of the central computer. Those skilled in the art will appreciate that the computer program can be written in other computer languages as a matter of design choice.

FIGS. 2–9 summarize the steps performed by the computer program while implementing the method of the present invention. These steps are merely illustrative of a preferred embodiment of the invention and can be modified or adapted.

Figure 2:
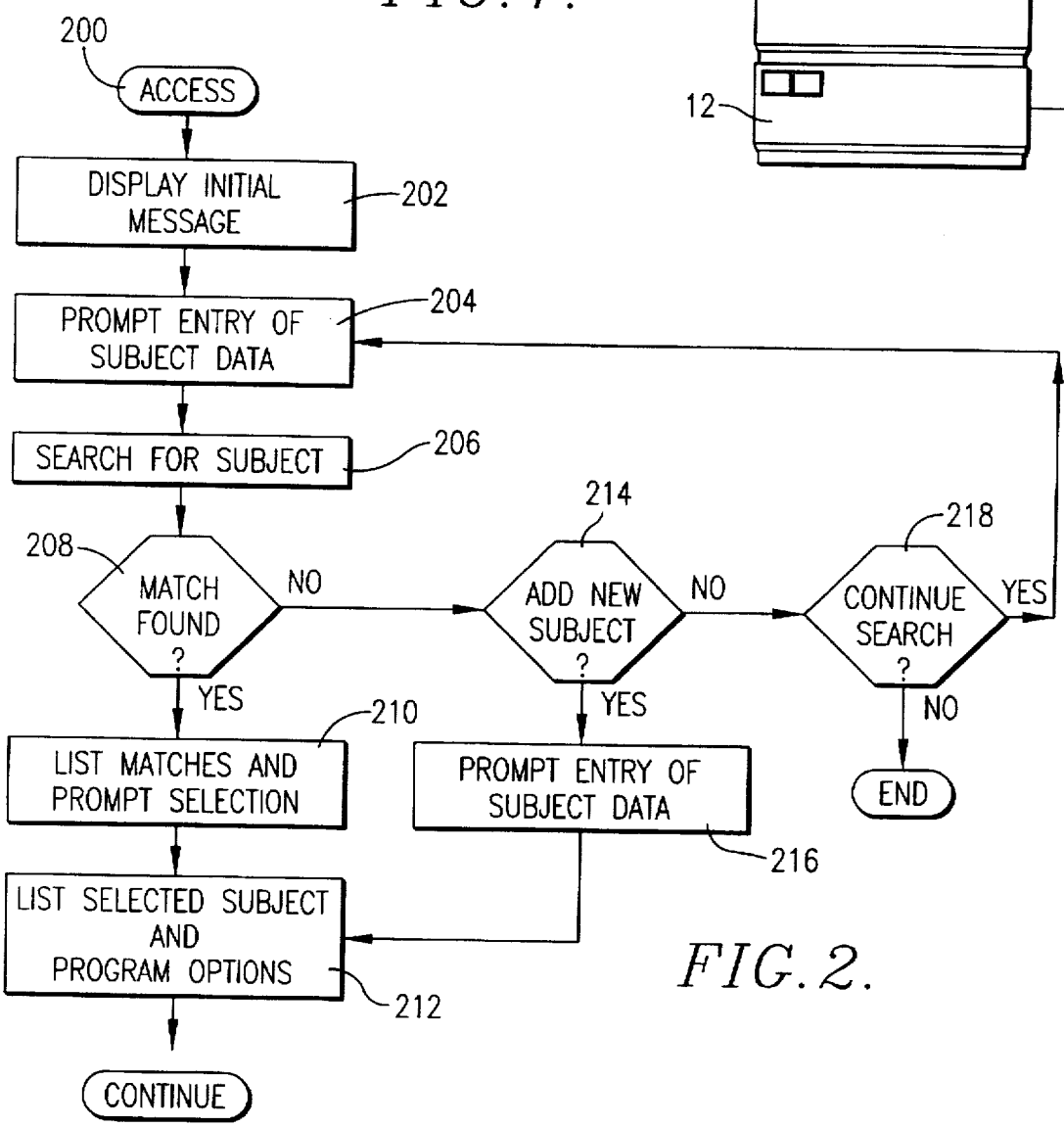
FIG. 2 is a flow chart illustrating the initial searching steps of the method and computer program of the present invention.

Referring to FIG. 2, the program begins at step 200 where a user operating one of the access terminals 14 accesses the central computer 12 by way of the telecommunications network 16. The access may include conventional log-on or connection for data transfer procedures. The central computer then displays or transmits an initial message to the access terminals describing the function and capabilities of the method as depicted in step 202.

The program then prompts the user to enter data needed to search for a particular subject in step 204. For example, the program may prompt the user to enter the name and address of a particular subject, the types of goods and services that the subject provides, or the product brand names or classes of products provided by the subject. The program uses the information entered in step 204 to search the memory of the central computer 12 to find a subject or subjects that match the search data as depicted in step 206.

If a match is found in step 208, the program moves to step 210 where a list of the subject or subjects matching the search data is displayed and/or transmitted to the appropriate access terminal 14. If more than one subject is found that matches the search data, step 210 prompts the user to select the desired subject. The program then moves to step 212 where the program lists the selected subject along with a list of further program options including "Register a Complaint", "Search Public Complaint Records", "Register a Response", "Remove a Complaint", "Settle a Dispute", "Automatic Decision Maker", and "Monitor Compliance". Each of these program options is discussed in detail below.

If no match is found in step 208, the program moves to step 214 which asks whether the user wishes to add a new subject to the memory of the central computer 12. If so, the program prompts the user in step 216 to enter subject data needed to identify the subject and stores this information in its memory. The program then moves to step 212 described above.

If the answer to step 214 is no, the program moves to step 218, which asks whether the user wishes to continue the search. If the user does, the program loops back to step 204 to prompt the user to enter new subject search data. However, if the user enters "no", the program ends and the user is disconnected from the central computer 12 or the program returns to step 202 to list the main menu or options.

Figure 3:
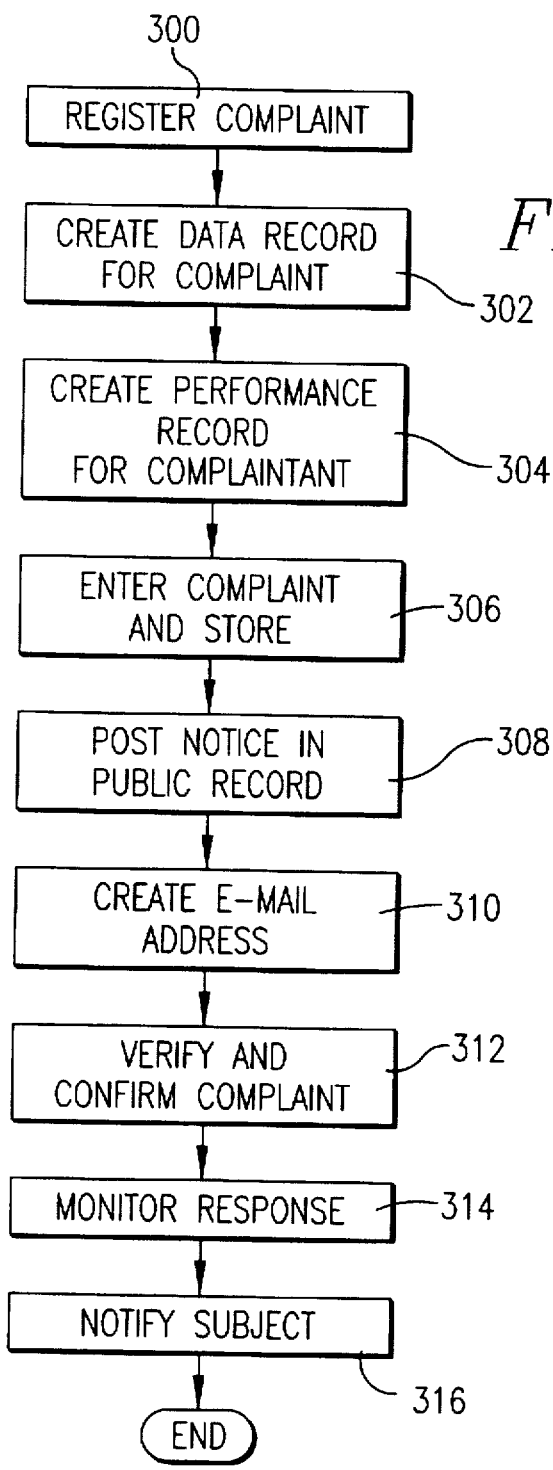
FIG. 3 is a flow chart illustrating the complaint registration steps of the invention.

FIG. 3 illustrates the "Register a Complaint" routine of the program and method. This portion of the program begins at step 300 where it displays or transmits instructions or information to the user at the appropriate access terminal 14. The program then prompts the user to enter identifying information in step 302 and creates a data record that is used to store the particular complaint, response, and other information relating to the complaint. The program also creates a performance record for the particular user in step 304 that is used to store information concerning the user's conduct while using the apparatus. As described in more detail below, the contents of the performance record are used to hold the user accountable for the user's actions and conduct while using the apparatus to encourage the user to file only legitimate complaints and to act fairly while attempting to resolve the complaints.

The program prompts the user to enter his or her complaint in step 306 and stores the complaint in the data record created in step 302 above. The program preferably prompts the user or complainant to enter a detailed complaint, the action the user requests to resolve the complaint or dispute, an abbreviated description of the complaint such as several key words summarizing the complaint, the user's phone number and e-mail address, and a personal "complaint resolved" password.

The program then posts or stores a notice of the complaint in a publicly searchable database or record in step 308. The notice preferably includes the key words or abbreviated description of the complaint entered by the user and is posted and stored in a publicly accessible and searchable complaint record such as a computer bulletin board. As described in more detail below, users other than the subject and complainant can access the central computer 12 to conduct research on the business conduct of subjects.

The program next creates a unique e-mail address in step 310 that corresponds to the data record created in step 302. The unique e-mail address is given only to the complainant and the subject so that it can be used as a private message area or as a password for entry into some type of private forum for negotiations between the complainant and the subject. This allows the complainant and subject to privately negotiate a settlement to the dispute without requiring the complainant to meet the subject face-to-face.

In step 312, the program verifies and confirms the complaint registered in step 302. The program accomplishes this by transmitting the complaint to the personal e-mail address entered by the complainant during registration and instructing the complainant to e-mail a confirmation including any corrections back to the central computer 12. The program then compares the information in the confirmation to the information received in step 302 to verify the accuracy of the complaint.

At appropriate times during the registration of a complaint, the program monitors the conduct of the complainant as depicted in step 314. For example, the program may monitor how long it takes the complainant to respond to the verification procedures in step 312. This monitoring information is stored in the user performance record created in step 304 above and used to rate the complainant's conduct as described in detail below.

The final step in the complaint registration routine of the program occurs when the program notifies the subject that a complaint has been lodged against it as depicted in step 316. The notification, which may occur by e-mail or conventional postal service mail, preferably includes the complete detailed complaint, the complainant's suggested resolution to the complaint, the private e-mail address, and instructions on how to use the complaint handling apparatus 10 to respond to the complaint. Once the "Register a Complaint" routine is completed, the program either ends or returns to step 212 of FIG. 2 to allow the user to select other program options.

The program may enable a party to a complaint to link the complaint to other registered complaints. This would allow a party to register a counter-complaint and link it to the original complaint. Similarly, a party could link a current complaint to any other complaints that the party feels are related to the present complaint and would like the complaint handling apparatus or a judge/jury to consider.

Figure 4:
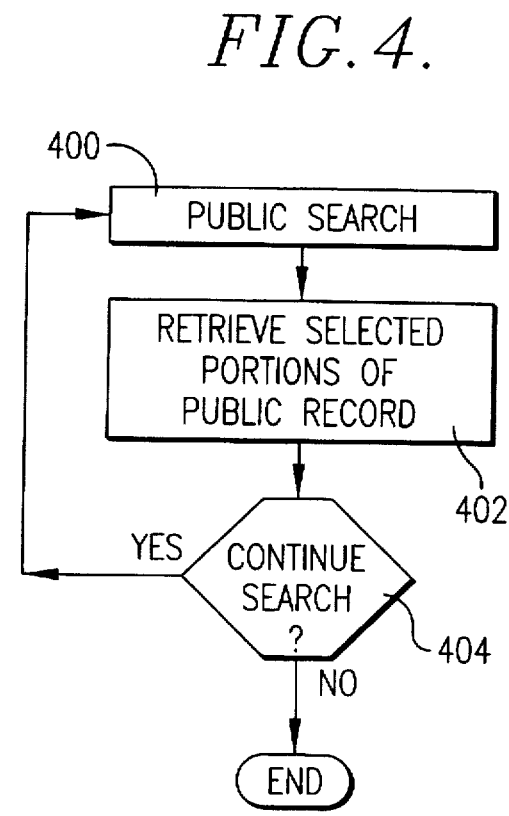
FIG. 4 is a flow chart illustrating the public access and search steps of the invention.

If the user selected the "Search Public Complaint Records" option in step 212 of FIG. 2, the program moves to the steps illustrated in FIG. 4. This routine begins at step 400 by providing the user instructions. The program then retrieves the portions of the publicly searchable complaint database that relate to the subject selected by the user as depicted in step 402. Step 404 permits the user to view other portions of the publicly searchable database or to search for other subjects.

Figure 5:
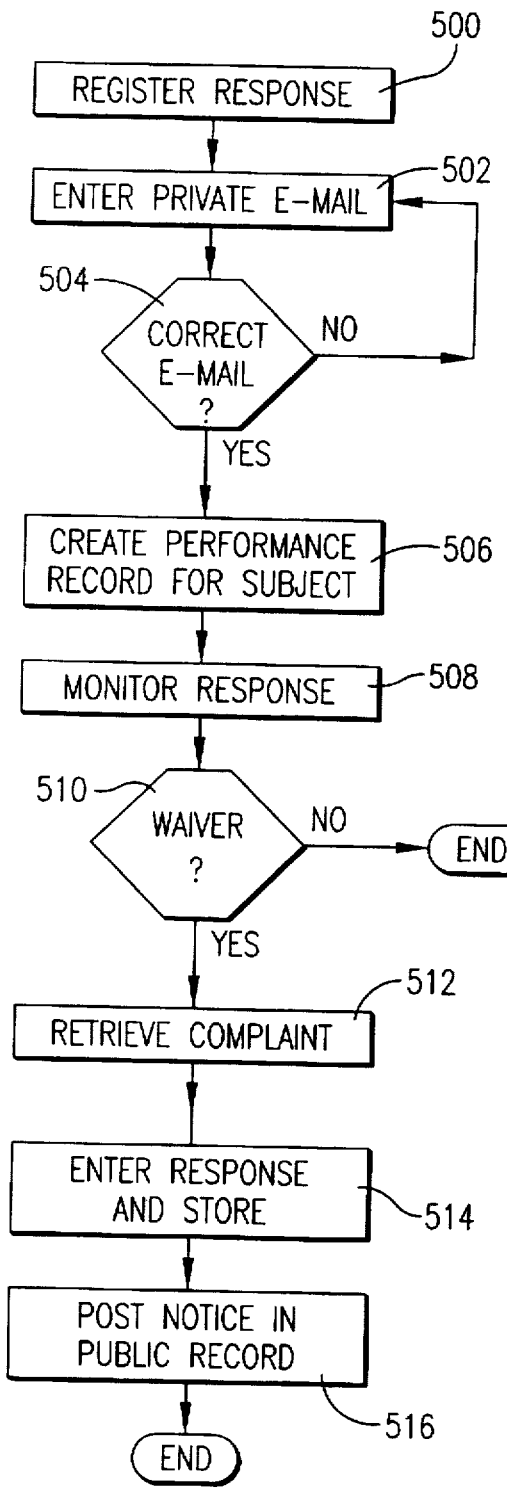
FIG. 5 is a flow chart illustrating the response registration steps of the invention.

If the user selected the "Register a Response" option in step 212 of FIG. 2, the program moves to the steps illustrated in FIG. 5. This portion of the program permits a subject to respond to a complaint issued against it. This routine may also be directly accessed by the subject without first completing the steps illustrated in FIG. 2.

The registration of a response begins at step 500 which provides initial information to the subject such as instructions on how to register a response. The program then prompts the subject to enter the private e-mail address or password that was created during the registration of the complaint determines whether the entered e-mail address is correct in steps 502 and 504. Since only the complainant and the subject are provided with this private e-mail address, only the subject of the complaint can enter a response to the complaint.

If the subject entered the correct private e-mail address, the program creates a performance record for the subject in step 506. The subject's performance record is used to store information concerning the subject's conduct while using the apparatus 10. As described in more detail below, the contents of the subject's performance record are used by the apparatus to hold the subject accountable for the subject's actions and conduct to encourage good conduct while using the apparatus 10.

At appropriate times during the registration of a response by the subject, the program monitors the conduct of the subject as depicted in step 508. For example, the program may monitor how long it takes the subject to respond to the notification sent in step 316 of FIG. 3. This monitoring information is stored in the subject's performance record created in step 506 and used to rate the subject's conduct as described in detail below.

To minimize liability resulting from the use of the apparatus 10 and to encourage users to file complaints without the fear of lawsuits, the program may require that the subject agree to a wavier of liability before proceeding. Specifically, step 510 may provide a summary of the complaint to the subject and then ask the subject whether it agrees not to pursue libel, slander or other legal actions resulting from use of the apparatus. The program may also monitor the subject's response to this request and store this information in the subject's performance record to rate the subject's cooperativeness. Additionally, the apparatus 10 does not disclose the actual names of the complainants to the subjects so that the complainants may remain anonymous. This further encourages users to file complaints with the apparatus.

If the subject refuses to agree to the waiver in step 510, the program ends or returns to the main menu screen. If the subject agrees to the waiver, the program retrieves the detailed complaint from the complaint data record in step 512 and allows the subject to review or download the complaint. The program then prompts the subject to respond to the complaint in step 514 and stores this response along with the complaint in the complaint data record.

The subject may respond to the complaint by entering information in one of the access terminals and e-mailing or transmitting the information to the central computer by way of the communications network or may mail or fax its response via conventional postal service mail or facsimile service. In the latter case, the response is optically scanned, optical character recognized, and transferred to the memory of central computer. Alternatively, the subject may provide an oral response to the complaint that is entered into the complaint handling apparatus by a voice recognition device.

Finally, the program posts selected portions of the response along with the selected portions of the complaint in the public record as depicted by step 516.

Figure 6:
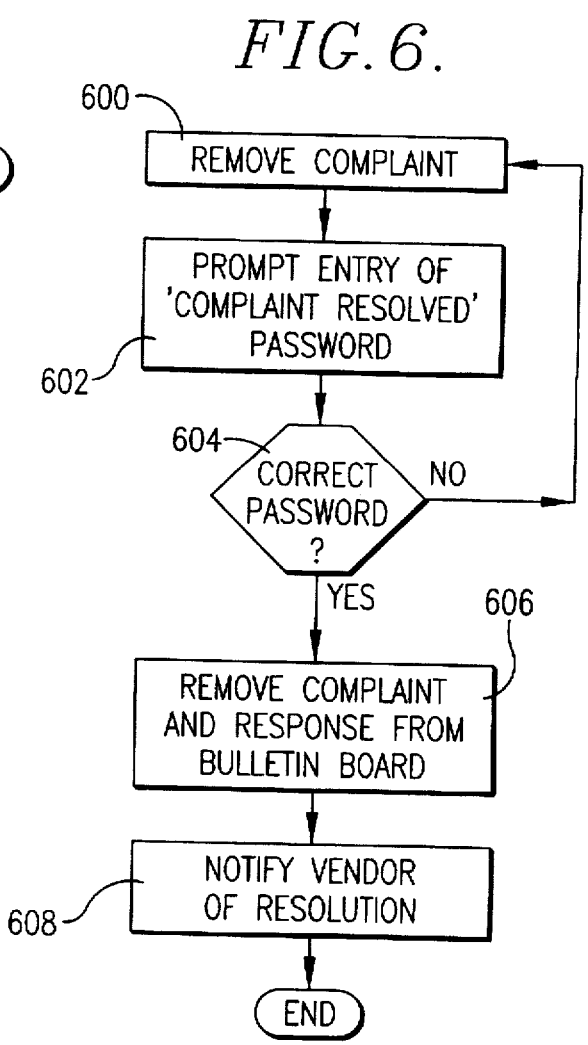
FIG. 6 is a flow chart illustrating the removal of a complaint steps of the invention.

If the user selected the "Remove a Complaint" option in step 212 of FIG. 2, the program moves to the steps illustrated in FIG. 6. This routine begins by providing the user instructions in step 600. The program then advances to step 602 which prompts the user to enter the "Complaint Resolved" password created for the particular complaint. As discussed above, the "Complaint Resolved" password is created by the complainant during complaint registration and is not disclosed to others so that only the complainant can remove a complaint from the public record portion of the central computer. In the preferred embodiment, step 504 prompts the complainant for his or her "Complaint Resolved" password by e-mail by sending an e-mail message to the complainant and prompting the complainant to send the "Complaint Resolved" password back to the central computer.

Step 604 determines whether the user entered the correct password. If the user did not, the program returns to step 602 to prompt the user to re-enter the "Complaint Resolved" password. The program may limit this loop to a predetermined number of attempts before disconnecting the user from the program. Once the user enters the correct password, the program removes the complaint and the associated response from the public record of the central computer in step 606. The program then notifies the subject that the complaint has been resolved to the complainant's satisfaction in step 608. This notification is preferably sent by e-mail to the complainant, but may also be sent by conventional postal service mail.

Figure 7:
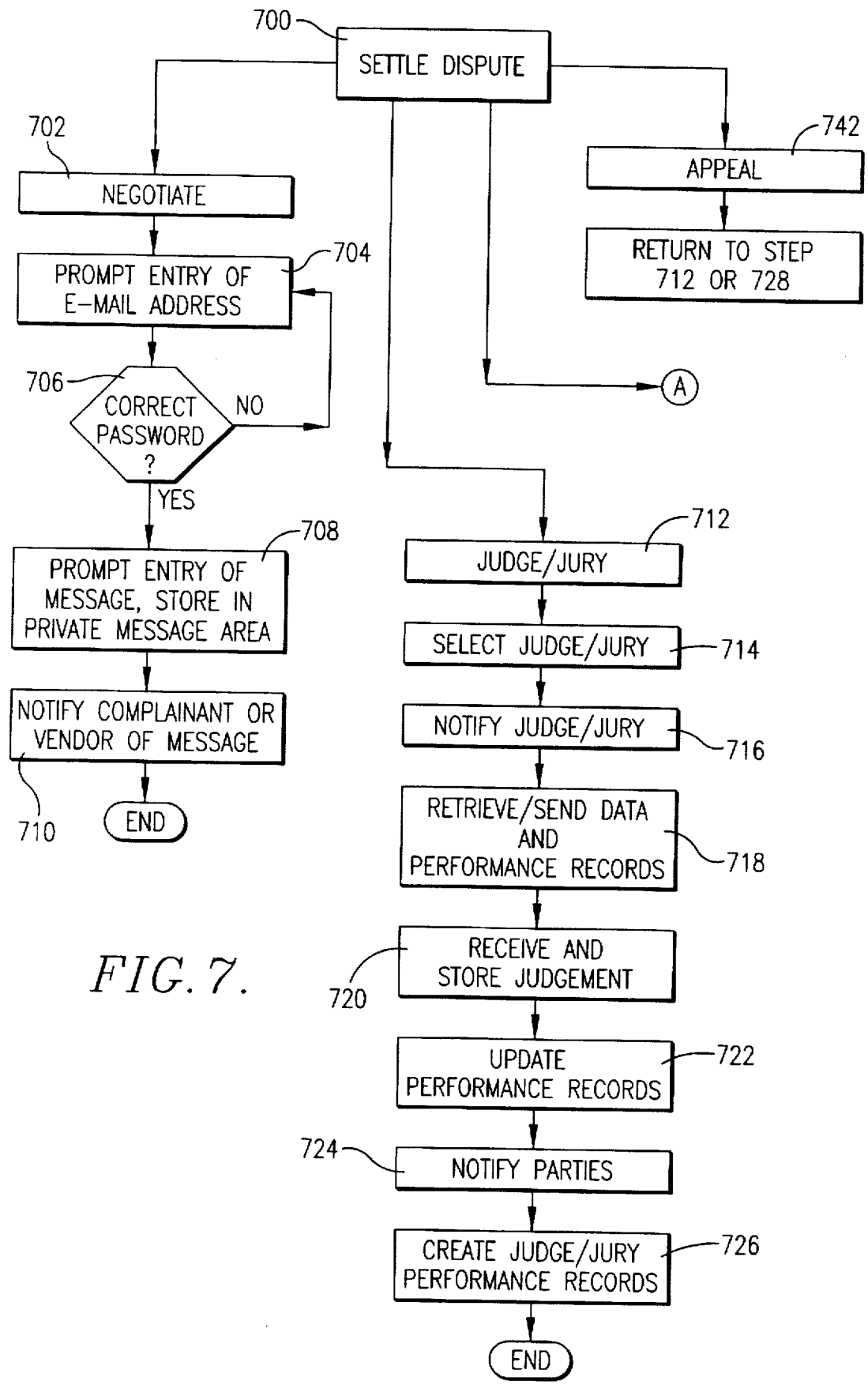
FIG. 7 is a flow chart illustrating the dispute settlement steps of the invention.

If the user selected the "Settle a Dispute" option in step 212 of FIG. 2, the program moves to the steps illustrated in FIG. 7. This routine begins in step 700 which provides instructions and allows the user to proceed by selecting one of the following options: "Negotiate the Complaint" to allow the user and subject to enter into private negotiations in an attempt to resolve the complaint; "Request a Judge/Jury" to allow either the user or subject to request intervention by a third party to resolve the dispute; "Automatic Negotiator" to allow the apparatus 10 to determine a resolution to the dispute; and "Appeal a Decision" to allow either part to appeal a decision that was rendered using either of the three previous settlement options.

If the user selects the "Negotiate the Complainant" option in step 700, the program precedes to step 702 which provides initial instructions. The program then prompts the user in step 704 to enter the password or unique e-mail address created in step 310 of FIG. 3. As discussed above, this e-mail address is given only to the complainant and the subject so that only the complainant and the subject can enter into this portion of the program.

The program then determines in step 706 whether the user entered the correct password or e-mail address. If not, the program returns to step 704 to prompt the user to re-enter the password or e-mail address. The program may limit this loop to a predetermined number of attempts before disconnecting the user from the program. However, if the password or e-mail address was correctly entered, step 708 prompts the complainant or the subject to enter a private message and then stores the message in a private message area. This message area is reserved for use by the complainant and the subject and the messages entered are not posted in the public records so that the parties are encouraged to enter messages that may resolve the dispute without fear of public reaction to the messages. The program then notifies the complainant or the subject of the receipt of the message in step 710 so that the other party can read and respond to the message.

The program may allow the complainant to establish a settlement (possibly a monetary value or a contract condition) that the complainant would accept to settle the dispute. This settlement offer would be communicated to the subject of the complaint as described above so that the subject could accept or refuse the settlement offer.

If the user selected the "Request a Judge/Jury" option in step 700, the program proceeds to step 712 which provides initial instructions to allow either the complainant or subject to request intervention by a third party to resolve the dispute. The program then selects a judge or a jury in step 714 from a list of pre-qualified persons who may have agreed to serve as judges or jurors. Preferably, these pre-qualified persons are categorized by criteria that is helpful in selecting an appropriate judge or jury so that the program can compare the characteristics of the persons on the judge/jury list to the characteristics of the dispute to select a judge or jury that would be the most appropriate for the dispute. For example, judges and jurors who have technical skills may be identified and selected to resolve disputes involving technical matters.

The program next notifies the selected judge or jurors in step 716 to determine whether they are willing to help settle the dispute. The apparatus and program may encourage participation by posting the names of willing judges and jurors on the public record or by paying or otherwise rewarding the judges and jurors. Compensation may also include increased or free access to the functions of the program or increased invitations to participate in future disputes. As judges and jurors develop a record as described below, the compensation may be in the form of benefits given for positive records or scores. Conversely, the program may monitor and identify participants who fail to perform to certain minimum standards, note this on their records and avoid inviting them to participate in the future.

If the selected judges or jurors indicate that they are willing to participate in the resolution of the complaint, the program retrieves the complaint data record in step 718 and transmits it to the selected judge or jurors or allows them to view the data record while on-line. The program also retrieves and allows the selected judge or jurors to review the performance records for both the complainant and the subject. If the selected judges or jurors are not willing to participate, the program notes this on their records and selects a new judge or jurors in step 714.

The judge or jurors then review all of the information regarding the complaint and issue their judgment. The judge/jury is encouraged to consider all the relevant information including the complaint, response, and past history of the complainant and subject as described in their respective performance records.

The judgement is received in the central computer in step 720 and stored along with the complaint and response in the appropriate complaint data record. The program then updates both the complainant's and the subject's performance records in step 722 to reflect the judgment. The program then uses this new information to adjust the rating or score for the complainant and the subject. Specifically, the rating or score for the prevailing party is increased, while the rating or score for the losing party is decreased.

Parties maintaining high scores or ratings may enjoy many benefits while using the apparatus. For example, these ratings or scores are used during the resolution of future complaints so that a party with a high score will more likely receive a favorable resolution to a future complaint while a party with a low score will more likely receive an unfavorable resolution. Thus, the monitoring and rating features of the program encourage the users to file only legitimate complaints and responses and to settle their disputes if they believe that the other party is right. The rating and score of each party may also affect the rating and score of the other party. For example, if both the complainant and the subject have high ratings and the subject prevails in the dispute, the subject's rating may be increased a greater amount since the subject prevailed against a party who has a good reputation. However, if the subject prevails against a complainant with a low rating or score, the subject's rating may be increased a lesser amount since the subject prevailed against a party with a poorer reputation.

The program next notifies the complainant and subject of the judgment in step 724. The notices are preferably sent by e-mail.

The apparatus and program may also monitor the performance of the judge and jurors and store this information in judge/jury performance records as depicted in step 726. For example, the program may monitor the response time and cooperation of the judge or jurors. The program may also monitor the accuracy of the judgments rendered by the judge or jurors by taking into account such factors as appeals, overrulings, and opposing judgments. These performance records are stored and maintained in memory accessible by the central computer 12 and periodically updated to indicate their accuracy over time. For example, if a judge's decision is not challenged after many years or is supported by other later decisions that agree with the initial decision, the performance record for that judge will be updated and recalculated to increase the performance rating or score for the judge. These performance records may then be accessed when selecting judges or jurors to resolve future conflicts or to reward the judges or jurors for their good performance.

The program may also use artificial intelligence techniques to process the information gathered in the performance records as well as information gathered by other means. For example, the program may compare all the information known about a dispute to the information known about potential judges and jurors to select the most appropriate judge or jurors to resolve the dispute.

Generally, the conduct of all third parties to disputes, such as judges, jurors, and witnesses, may also be monitored by the apparatus and stored in performance records. When the program uses artificial intelligent techniques to make a decision regarding a dispute, it considers the performance records of all participants to the dispute when rendering a judgment. As discussed above, participants with low performance ratings or scores may have less of an impact on a judgment than participants with high performance ratings or scores.

The program may also allow general users of the apparatus to indicate their support or opposition to a judgment by posting the judgment and encouraging responses. The program then uses all of this information to rate the judge or jurors. These ratings are used when selecting judges or jurors for future disputes so that judges or jurors with low performance ratings are not selected again.

Figure 7A:
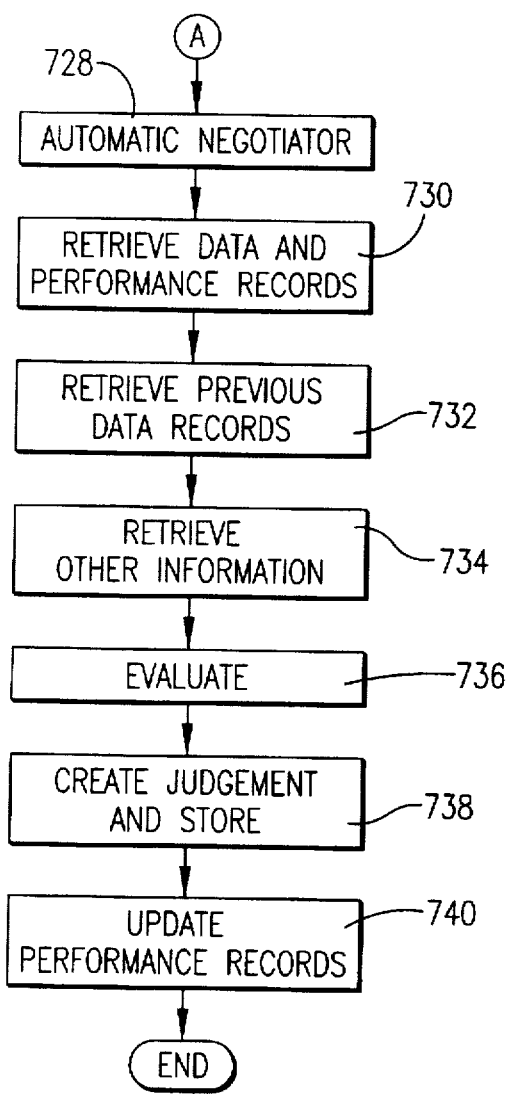
FIG. 7A is a continuation of FIG. 7.

If the user selected the "Automatic Negotiator" option in step 700, the program proceeds to step 728 depicted in FIG. 7A which provides initial instructions on how to allow the apparatus to automatically review the complaint data record and enter a judgment. The program then retrieves the complaint data record and the performance records in step 730.

To assist in the automatic judgment process, the program also retrieves data records from previously resolved complaints in step 732 and other information such as evidence acquired from interested third parties in step 734. All third parties involved in a dispute such as judges, jurors, witnesses, attorneys, etc., may be encouraged to contribute information. The program may also access other information such as the general public sentiment regarding the dispute to establish an overall setting or environment for the dispute to aid in the artificial intelligence processing.

The method and apparatus of the present invention may use any conventional input collection methods such as questionnaires, cameras, tape recorders, etc., to gather the information described above. The program may also be configured to receive physical information from the parties to the dispute such as information from lie detector devices.

The program then evaluates all of the gathered information in step 736 to arrive at a judgment. For example, the program may compare the characteristics from the current data record with the characteristics from the data records for the previously resolved complaints to arrive at an appropriate judgment. Over time, the apparatus and program will accumulate a large number of data records that can be used to accurately predict the proper judgment for almost any type of complaint or dispute.

The program may employ artificial intelligence processing with neural networks, fuzzy logic, and/or genetic algorithms to analyze various scenarios using the gathered information described above or any other available information to determine the best solution or outcome to a dispute. By tracking decisions and their effects on any number of environmental/societal factors, the genetic algorithms could be used to test the far-reaching and long-term affects of a decision on society by employing what the program has learned about how decisions affect society and render future decisions based on collected data in a way that will most likely result in positive effects on society.

Step 738 of the program then creates the judgment for the present complaint and stores it along with the complaint and response in the complaint data record. Finally, the program updates the complainant's and the subject's data records in step 740 in the same manner as described in step 722 above.

If the user selected the "Appeal" option in step 700, the program proceeds to step 742 which provides initial instructions to allow either the complainant or subject to request an appeal of a dispute that was resolved by either the Judge/Jury or Automatic Negotiator methods described above. The program then returns to either step 712 or step 728 to repeat a judgment process with either a new judge or jury or under the Automatic Negotiator routine.

Figure 8:
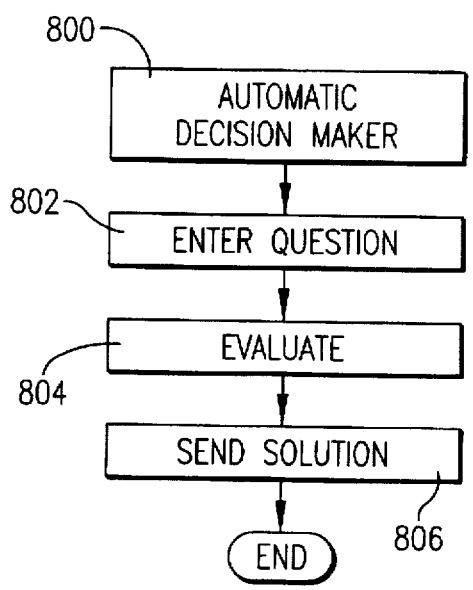
FIG. 8 is a flow chart illustrating the automatic decision maker steps of the invention.

If the user selected the "Automatic Decision Maker" option in step 212 of FIG. 2, the program proceeds to the steps illustrated in FIG. 8. This routine allows any user, including those who are contemplating filing a complaint or responding to a complaint, to determine the likely resolution of a dispute before the dispute actually occurs.

This routine also allows a user to gain information that may be useful regarding a future interaction with another person or entity. For example, a person may wish to determine whether interacting with certain other parties in a given situation may result in a dispute or complaint. By monitoring participant behavior in certain situations and outcomes (complaint activity or measurable satisfaction levels) over time, the program may compare the current situation with other similar situations having known outcomes and predict the outcome for the present situation based on these known outcomes. Artificial intelligence techniques may be used to predict an outcome based on what it has learned about behavior, situations and their outcomes. Thus, the program may suggest the best behavior to the user to reduce the number of complaints by providing guidelines for appropriate behavior before a dispute arises. This routine of the program may also enable users to test their ability to gain a favorable outcome to a dispute in a simulated dispute resolution process.

This routine may also be used to affect government policy and laws. For example, the program may monitor registered complaints and other gathered information as described above to determine if certain government policies or laws are frequently violated or to identify problem areas that should be addressed by a law/policy change. The program could then determine and suggest potential changes to government policies or laws that would take into account this information. By monitoring participant behavior in given situations and outcomes (complaint activity on measurable satisfaction levels) over time, the program/apparatus may recommend/predict policy/law that will most likely result in a positive effect on society. The artificial intelligence techniques described above may be used for this purpose.

The "Automatic Decision Maker" routine of the program begins at step 800 which provides initial instructions. The program then prompts the user in step 802 to enter the user's questions or potential disputes. The program then retrieves data records from previously resolved complaints in step 804 to evaluate the information entered in step 802 to arrive at a proposed solution to the current question or dispute. For example, the program may compare the characteristics from the current question or dispute with the characteristics from the data records for the previously resolved complaints to arrive at an appropriate solution. Over time, the apparatus and program will accumulate a large number of data records that can be used to accurately predict a solution for almost any type of complaint or dispute. The program then transmits or allows the user to view the proposed solution in step 806.

Figure 9:
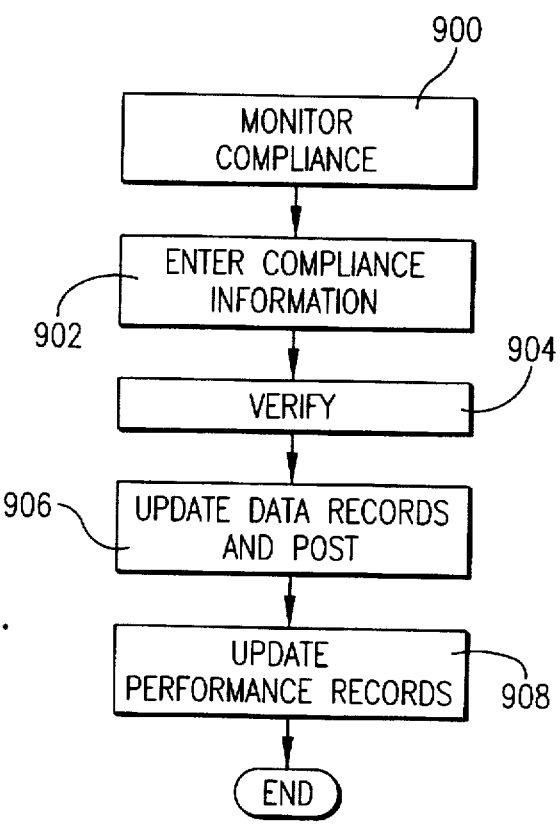
FIG. 9 is a flow chart illustrating the compliance monitoring steps of the invention.

If the user selected the "Monitor Compliance" option in step 212 of FIG. 2, the program proceeds to the steps illustrated in FIG. 9. This routine allows any user, including the complainant, subject, judge, jurors, and third parties, to monitor a complainant's or subject's compliance with the terms of a previously entered judgment.

This routine of the program begins at step 900 which provides instructions. The program then prompts the user to enter compliance information in step 902. For example, assume that a dispute was resolved using any of the previous routines described above, a judgment was rendered that required the subject to reimburse the complainant for damaged merchandise, and the subject failed to comply with the judgement. The complainant may then enter information at step 902 indicating that the subject failed to comply with the judgment.

The program then moves to step 904 where it verifies the accuracy of the information entered in step 902. This may be achieved by soliciting proof from either the complainant or the subject or by contacting the judge/jurors or independent third parties or witnesses or data source. Alternately, the apparatus and program may directly monitor compliance such as when payment is required by a judgment and collection and payment of funds is controlled by the central computer.

If the program determines that one of the parties in fact failed to comply with a term or condition of a judgment, it updates the appropriate data record to indicate the compliance failure and posts the information in the public record as depicted in step 906 to alert others to this failure and to discourage others from doing business with the party. This provides a valuable research tool for users wishing to research the conduct of a party and encourages the parties to a dispute to comply with the judgment rendered by the apparatus and program to avoid a negative public reputation.

The compliance monitoring routine of the program also updates the appropriate party's performance record in step 908 to indicate that the party failed to comply with the judgment and then recalculates the party's performance rating or score. This will prejudice the party during future interaction with the apparatus such as when attempting to resolve future disputes. A lower performance rating or score will, for instance, decrease the likelihood of a favorable outcome for the party.

At any time during the use of the apparatus, the program may require any of the users to pay a fee. For example, the program may require a user to pay a fee before posting a complaint or require a subject to pay a fee before posting a response to a complaint. A portion of these collected fees can be used to pay or reward, and thus encourage judges, jurors, and third party witnesses to participate in a complaint resolution process. The fees can be collected by various methods including a 900 number charge back line or by credit card processing while on-line.

The complaint handling apparatus and method may also include an evidence recording module (a remote extension of the complaint handling apparatus comprised of software and hardware) that could be used by participants (carried on their person) to enable the complaint handling apparatus to record evidence needed to back up their complaint handling apparatus complaint claims. This module would enable the complaint handling apparatus to record linked descriptive information about subjects, objects, participants, and situations (all data would be recorded simultaneously by the module and thus linked). By monitoring and recording any number of data (audio, video, satisfaction data, etc.) via this module, the complaint handling apparatus would be able to make accurate artificial intelligence decisions (the more data that can be factored into the artificial intelligence "learning" process and decisions, the better. For example, it could record satisfaction ratings while the participant is interacting with various subjects, link the data with the object and the situation, and thus "learn" the satisfaction level of the participant while interacting with or monitoring the object in that situation).

The complaint handling apparatus, through artificial intelligence and recognition technology processing, may identify the subject, the situation, and the "complainable" actions by the subject, and process the complaint. The complaint handling apparatus may do this automatically during monitoring via the module, automating the entire complaint handling apparatus process for participants. The complaint handling apparatus would identify offenses and violations as they occur and process them automatically, or the complaint handling apparatus may notify a participant that a complainable offense has occurred and was recorded, allow participant to approve the processing of a complaint, allow participant to approve of accessing his/her record data, and process the complaint. All the participant would have to do is activate the module.

The complaint handling apparatus and method may also include a satisfaction/complaint likelihood warning module. Using this module (a remote extension of the complaint handling apparatus comprised of software and hardware) in conjunction with the evidence recording module, the complaint handling apparatus would, through artificial intelligence processing on available data, recognize recorded objects, predict a satisfaction level for the participant regarding the object, and may perform this automatically while monitoring, giving a "heads up" warning of satisfaction/dissatisfaction on the fly, as encounters are about to ensue. A participant may encounter objects previously encountered by others and the complaint handling apparatus may draw from available data and be able to recognize the object and the situation and inform the participant of what the complaint handling apparatus knows about the object, for example, information gathered from previous recorded encounters, in similar situations. The complaint handling apparatus may create warnings or bulletins on objects based on what it knows about the participant, the object, and the situation and based upon artificial intelligence or neural network linking be able to predict the satisfaction or likelihood of the complaint level that the participant will likely experience interacting with the object given the situation. For example, the complaint handling apparatus may match the profile of the participant with other similar participants who have encountered the object and based on their collective satisfaction (and complaints) predict the current participant's satisfaction and predict/recommend action that would result in highest satisfaction.

A device incorporating these modules could be worn (or even implanted) and would record interactions (audio/visual, radar, and satisfaction data) at all times to provide evidence that would be needed to support virtually any complaint handling apparatus complaint claim as well as provide information on the fly (warnings). If in the future, satisfaction can be monitored with some sort of technology, like lie detector technology, and this data could be directly linked to the other evidence data. It would record a user's interactions with potentially every object and keep a comprehensive record of it, including the user's satisfaction level with every object. It could even potentially recognize (via artificial intelligence and recognition technology) the same object if someone else encounters it and automatically inform the party of what it has learned about it (as well as add more data to its record from the next party's encounter).

This linked satisfaction data coupled with complaint activity data could enable accurate complaint handling apparatus decisions, predictions and changes in policy. For example, if a user were accosted by a belligerent panhandler, the user's satisfaction data would be decidedly negative. If similar encounters by others resulted in similar satisfaction levels, this would signal to the complaint handling apparatus that panhandling should be outlawed based on its effect on people's quality of life.

With these modules the entire complaint handling apparatus complaint resolution decision process might be completely automated. Users would not need to register a complaint against the belligerent panhandler per se; the complaint handling apparatus might automatically recognize the panhandler, gauge the user's satisfaction, and render a judgement against the panhandler (and mark his record, make him pay, etc.). All the user would have to do is operate the module.

The complaint handling apparatus and method may also include a warning response module. Using this module (a remote extension of the complaint handling apparatus comprised of software and hardware) with the two modules above, the complaint handling apparatus would, through artificial intelligence processing on available data, recognize recorded objects, predict a satisfaction level for the participant regarding the object, recommend a best behavior regarding the interaction—behavior that would minimize dissatisfaction among participants and may do this automatically as encounters are about to ensue. A participant may encounter objects previously encountered by others and the complaint handling apparatus may draw from available data and be able to recognize the object and the situation and inform the participant about what action to take (e.g., gathered from previous complaint handling apparatus' recorded encounters). The complaint handling apparatus may, based on artificial intelligence (e.g., neural network linking) be able to predict the best actions given the situation as learned through similar previously recorded encounters. (e.g., the complaint handling apparatus may match the profile of the participant with other similar participants who have encountered the object and based on their collective satisfaction (and complaints) predict the current participant's best actions).

The complaint handling apparatus and method may also include a satisfaction control module. Using this module (a remote extension of the complaint handling apparatus comprised of software and hardware) with the first two modules above, the complaint handling apparatus would, through artificial intelligence processing on available data, recognize recorded objects, predict a satisfaction level for the participant regarding the object, and control the complaint handling apparatus controllable devices in a way that would minimize dissatisfaction among participants and may do this automatically as encounters are about to ensue. A participant may encounter objects previously encountered by others and the complaint handling apparatus may draw from available data and be able to recognize the object and the situation and adjust the activities of controllable objects to maximize the satisfaction of the participant. The complaint handling apparatus may, based on artificial intelligence (e.g., neural network linking) be able to predict the best actions for controllable objects in the situation as learned through similar previously recorded encounters (e.g., the complaint handling apparatus may match the profile of the participant with other similar participants who have encountered the object with controllable objects that acted certain ways in similar situations and based on their collective satisfaction [and complaints] predict the best actions for objects given participants' satisfaction levels and control the objects accordingly in a way that will result in the highest satisfaction levels overall and overtime).

The complaint handling apparatus and method may also include introduction of satisfaction data to the complaint handling apparatus process. The complaint handling apparatus monitors and records participant's satisfaction using any of a number of methods (e.g., questionnaire, electrosensor, etc.) during monitoring or afterwards (any method that enables satisfaction input to be associated or linked to other recorded input (audio/video, etc.) and this data, adding to profiles or records of objects, may aid the complaint handling apparatus in identifying objects and making its decisions during the complaint handling apparatus processes. (The complaint handling apparatus links satisfaction data with what it knows the object looks like, sounds like, etc. Later others may encounter the same object and the complaint handling apparatus will be able to better recognize it.)

Satisfaction data may be used by the complaint handling apparatus as evidence by which better judgments and decisions can be made. Satisfaction data, like other recorded data, would be made available to third parties or factored into the complaint handling apparatus' artificial intelligence automated judgment process. (e.g., recorded satisfaction data may support the complainant in arguing damages.)

The complaint handling apparatus may make satisfaction information (records and profiles) public in the form of searchable records. (Public records serve as a reputation which encourages satisfaction-promoting behavior by the responsible party.)

An aggregate of satisfaction data would be available to the complaint handling apparatus to enable the complaint handling apparatus, through artificial intelligence processing, to make better policy adjustments. (Policy adjustments might include: adjusting severity of judgments, adjusting laws/rules that govern participants both within and outside of the complaint handling apparatus.) The complaint handling apparatus could, based on an aggregate of "learned" satisfaction data culled from previous monitored activity, adjust policy to sustain a low level of complaints/ dissatisfaction. As complaints/dissatisfaction increases regarding certain situations (involving certain types of objects) the complaint handling apparatus would increase severity and frequency of judgments and/or laws applicable to those situations/objects to address the increases.

Satisfaction data would be available to the complaint handling apparatus, during artificial intelligence processing, to enable the complaint handling apparatus to make better predictions. (Predictions might include, predicted interaction outcomes, predicted complaint resolution outcomes, predicted outcomes due to policy changes.) The complaint handling apparatus could predict outcomes given a certain situation involving certain objects based on an aggregate of "learned" satisfaction data culled from previously monitored activity.

Satisfaction data would be available to the complaint handling apparatus to enable the complaint handling apparatus to make, through artificial intelligence processing, better recommendations. The complaint handling apparatus could recommend best actions or behavior given a certain situation involving certain objects based on an aggregate of "learned" satisfaction data culled from previously monitored activity. The complaint handling apparatus would recommend the actions that resulted in the most satisfaction and least complaints.

The complaint handling apparatus and method may also assume the role of government during the complaint handling apparatus processes. The complaint handling apparatus may automatically enact laws—and automatically enforce them through the complaint resolution process.

The complaint handling apparatus may enact "laws" based on an available satisfaction and complaint data monitored over time (e.g., the more a majority or large number of citizens are unsatisfied regarding situation/objects, the more "laws" the complaint handling apparatus enacts to uphold society norms regarding those situations/objects). The complaint handling apparatus would identify offenses that should be curbed and may automatically impose restrictions (laws) on those offenses, and publish them via public database. The complaint handling apparatus would then use those laws to determine that registered complaints are violations of law.

If the complaint handling apparatus recognizes a problem area (many complaints or dissatisfaction recordings) and there are no existing laws to address it, the complaint handling apparatus may, through artificial intelligence processing, identify the offending behavior and outlaw It or impose (recommend) best guess curbs on that behavior. The complaint handling apparatus may enable participants to recommend alternative solutions. The complaint handling apparatus may enable participants to vote on proposed new laws/curbs and participant-recommended alternative solutions, or provide satisfaction input (through any number of means) regarding them, and include this input into the decision. (Input from participants with better records |the complaint handling apparatus or other| is weighted higher than participants with lesser records.) The complaint handling apparatus monitors the effects of the new laws/curbs. If the laws/curbs are successful in reducing complaints and increasing satisfaction, the curbs remain. If not, new laws/ curbs are imposed (tested) and monitored until a low complaint/high satisfaction level is maintained. (There is a fine line between government enacted laws and court generated case precedent). Laws are published by government, precedent is published by the court. Courts use laws to make judgments, laws are enforced by the courts. Since they are nearly one and the same, the complaint handling apparatus could easily do both. The distinction between precedent and laws with the complaint handling apparatus would be: precedent are the individual decisions or recommended decisions that result from the complaint handling apparatus complaint resolution processes, laws are the published curbs on behavior resulting from an aggregate of complaint data (precedent) and other factored in data (such as satisfaction data).

The complaint handling apparatus and method may also serve as law violation processor. The complaint handling apparatus may enable participants to report violations (without the need for police officer backup). They simply present their claim (complaints) with their evidence and the complaint handling apparatus process would determine whether there was indeed a violation.

The complaint handling apparatus may automatically determine, through artificial intelligence, whether a reported complaint is a violation of law and should be upheld by the government. (The complaint handling apparatus may learn this from past cases and data collected—as cases are decided and laws are cited the complaint handling apparatus learns their applicability). If determined a violation, the complaint handling apparatus makes government (or itself) the plaintiff relieving the reporting participant of this duty in the complaint handling apparatus processes (if not a violation of law, the reporter is given the opportunity to take the offense as a complaint to the complaint handling apparatus as a civil case).

The complaint handling apparatus may, through artificial intelligence, be able to identify (similarly to identifying any other object) the laws/rules that were broken or produce a list of possible laws/rules for the plaintiff or a third party to choose from and determine the corresponding punishment or judgment. Via the complaint handling apparatus artificial intelligence processing, the complaint handling apparatus may determine the appropriate fees/judgements, adjusted to reflect the degree of violation/offense in relation to an aggregate of societal input data (primarily satisfaction/ complaint info). The complaint handling apparatus processes data, renders a judgment, and automatically produces and sends the offending object (or party responsible) a citation or notice of reported offense/violation via standard methods (E-mail, US mail, etc.) and how to appear in court or pay the citation. The complaint handling apparatus may handle the court process using the complaint handling apparatus technology and the meeting of judgement conditions including collecting and distributing monetary fees/ judgments as described in the complaint handling apparatus disclosures. The complaint handling apparatus records or profiles are continuously updated to reflect the violation/ judgement on the party's (object's and reporter's) records (a party's record may be impacted positively by the party's successful violation report).

EXAMPLE

Speeding.

A participant could report (or register a complaint against) a speeding motorist to the complaint handling apparatus. The participant would submit the complaint, along with evidence to support it, and the complaint handling apparatus would process the complaint. The complaint handling apparatus would determine whether the complaint is a violation of law. If so, the complaint handling apparatus determines the punishment, mails the citation, etc. If not, the participant can argue the case him/herself using the complaint handling apparatus processes and by doing so argue in favor of a law to curb this behavior.

If there are a sufficient number of complaints regarding speeding, the complaint handling apparatus may enact a law to curb this behavior such as outlawing speeding and publishing the law. (If there was a 30 mph limit, and the speeder was traveling 35 mph, the complaint handling apparatus would make the government (or itself) the plaintiff, citations would be mailed, and records would be updated. If the speed limit was 30 mph, and the speeder was traveling 30 mph, but the participant was still offended, the complaint handling apparatus would process the complaint with participant as plaintiff (civil case) and determine a decision. If, considering all evidence, the decision is indeed that the speeder is at fault, the complaint handling apparatus would decide against the speeder, update his records, and may, if there are many other complaints regarding speeding in similar situations, lower the speed limit and post the new law and reward the complainant.

If satisfaction data were available as evidence that the driver was indeed offensive to the participant, this data would support the participant's claims during the complaint handling apparatus processes.

If an evidence recording module were used to record an incident and its various inputs (e.g., audio/video, radar, satisfaction, etc.) during interactions, the participant would have solid evidence recordings of the inputs from interactions with the speeder. The complaint handling apparatus, via this module, may automatically identify the speeder, the offense(s), and process the complaint, eliminating the need for participant to actually report the offense because the complaint handling apparatus would pick it up automatically.

If a satisfaction warning module were used, the complaint handling apparatus could warn participants of potential results of interacting with the speeder before actually doing so. The participant would be warned of the potential dissatisfaction regarding the oncoming speeder and the speeding action so that participant can take evasive action.

If a satisfaction warning response module were used, the complaint handling apparatus may automatically recommend best actions to take to minimize dissatisfaction. Instead of actually warning the participant, the complaint handling apparatus may recommend that the participant take some sort of action to prevent the speeding behavior.

If a satisfaction warning response control module were used, the complaint handling apparatus may automatically control the complaint handling apparatus controllable devices to prevent dissatisfaction. Instead of warning the participant or recommending actions, the complaint handling apparatus may be able to control the car of the speeder—to slow it down (if the car is a complaint handling apparatus controllable device).

The complaint handling apparatus and method may also include a consumer complaint prevention module. The complaint handling apparatus may include a module (a remote extension of the complaint handling apparatus comprised of software and hardware) that could be used by participants to facilitate complaints regarding purchases. Participants would arrange to pay for goods using the complaint handling apparatus as a middleman. The complaint handling apparatus would accept payment from participant, instruct seller to deliver the product/service, hold the payment for a grace period, and pay the seller if there were no complaints regarding the goods. If participant registers a complaint regarding the purchase during the grace period, the complaint handling apparatus suspends payment to the seller, and processes the complaint using the complaint handling apparatus processes. The complaint handling apparatus holds the payment amount until the complaint is resolved, then pays parties as determined by settlement or judgment.

The complaint handling apparatus and method may also serve as an ultimate reputation monitor. Via the above modules, the complaint handling apparatus may monitor any number of recordable participant/object activities within or outside of the complaint handling apparatus and may maintain records on recorded objects updated over time as recorded encounters occur. By also recording and monitoring an aggregate of information such as complaint, sentiment, satisfaction, environment, and scientific data, and using artificial intelligence processes to link all data, the complaint handling apparatus would be able to identify object behavior as bad (e.g., complaint generating) or good (e.g., satisfaction generating) and may update object records according to their behavior displayed (and recorded) over time. (e.g., if the complaint handling apparatus monitors speeding behavior by objects, the complaint handling apparatus could determine that speeding is bad behavior by linking it with satisfaction and environment data). If there are many complaints relating to that behavior, or if the complaint handling apparatus finds that higher speeds emit more toxins than slower speeds and the complaint handling apparatus knows toxins negative affect, the natural environment and that the natural environment is necessary for human existence, the complaint handling apparatus would reduce the behavior ratings of all objects displaying this behavior. The complaint handling apparatus would reduce behavior ratings even more for objects that have displayed the behavior more frequently or for a longer time-span.

The complaint handling apparatus may make these ratings available to the public via public object records to encourage objects to behave in a good manner, and consider the long term effects of their actions. The complaint handling apparatus may access behavior ratings to determine what the participant can and cannot do while they use the complaint handling apparatus. The complaint handling apparatus may extend benefits to those that have good records, benefits such as: monetary rewards, increased access to the complaint handling apparatus functions, increased invitations to participate in the complaint handling apparatus activities in the future, higher impact during future involvement with the complaint handling apparatus, express service for future complaints, more sympathetic judgments for future complaints, etc. Likewise the complaint handling apparatus may impose restrictions on those participants that have bad records, restrictions such as: monetary fines, restricted access to the complaint handling apparatus functions, restricted participation in the complaint handling apparatus activities in the future, reduced impact during future involvement with the complaint handling apparatus, less sympathetic judgments for future complaints, etc.

Although the invention has been described with reference to the preferred embodiment illustrated in the attached drawing figures, it is noted that equivalents may be employed and substitutions made herein without departing from the scope of the invention as recited in the claims. For example, although many of the steps of the present method have been described in terms of on-line transactions, some of the steps may actually occur "off-line" via e-mail, voice, or other data transmission processing means. Additionally, the complaint handling method of the present invention is applicable to operating virtually all types of memory storage devices, and the preferred complaint handling apparatus device, telecommunications networks, and individual access terminals as described above may be replaced with any types of computers and communication networks. Additionally, the complaint handling method may be implemented in a computer system within a single corporation with a plurality of directly coupled computers or access terminals without a telecommunications network.

Having thus described the preferred embodiment of the invention, what is claimed as new and desired to be protected by letters patent includes the following:

1. A computer program stored on a computer-readable memory device for directing a computer to handle user complaints against subjects, said computer program comprising:
   receiving means for receiving a complaint from a complainant against a subject and a response to said complaint from the subject;
   storing means for storing said complaint and response in a data record; and
   negotiating means for directing the computer to negotiate a settlement of said complaint, said negotiating means including:
      selecting means for selecting a third party negotiator;
      accessing means for allowing the negotiator to access the data record and retrieve and review the contents of the data record; and
      receiving means for receiving a judgment of the complaint rendered by the negotiator.

2. The computer program as recited in claim 1, said negotiating means further including storing means for storing said judgment in said data record in association with said complaint and response.

3. The computer program as recited in claim 1, said third party negotiator being selected from the group consisting of a judge, a plurality of jurors, an arbitrator, and a plurality of users of the complaint handling computer means.

4. The computer program as recited in claim 1, said receiving means being operable for receiving complaints from a plurality of complainants against a plurality of subjects and a plurality of responses to said complaints from the subjects, said storing means being operable for storing said complaints and responses in a plurality of data records, and said negotiating means being operable for negotiating settlements for each of said complaints and responses and for storing said settlements in said data records in association with the respective complaints and responses.

5. The computer program as recited in claim 4, said negotiating means including:
   accessing means for accessing a plurality of other previously stored data records;
   comparing means for comparing said data record with said other data records;
   identifying means for identifying characteristics of said previously stored data records that are similar to the complaint and response in said data record; and
   creating means for creating a judgment for said complaint and response based on the previous judgments in the identified data records.

6. A computer program stored on a computer-readable memory device for directing a computer to handle user complaints against subjects, said computer program comprising:
   receiving means for receiving a complaint from a complainant against a subject and a response to said complaint from the subject;
   storing means for storing said complaint and response in a data record;
   negotiating means for directing the computer to negotiate a settlement of said complaint;
   monitoring means for monitoring the complainant's and the subject's performance; and
   rating means responsive to the monitoring means for rating the complainant's and the subject's performance for use in negotiating the settlement to the complaint.

7. A complaint handling computer apparatus for handling user complaints from complainants against subjects, said apparatus comprising:
   receiving means for receiving a complaint from a complainant against a subject and a response to said complaint from the subject;
   negotiating means for negotiating a settlement of said complaint;
   storing means for storing said complaint, response, and settlement in a data record; and
   accessing means for allowing persons other than the complainant and the subject to access the data record to review said complaint, response, and settlement;
   said negotiating means including:
      selecting means for selecting a third party negotiator from a list of possible negotiators;
      notifying means for notifying the negotiator;
      accessing means for allowing the negotiator to access the data record and retrieve and review the contents of the data record; and
      receiving means for receiving a judgment of the complaint rendered by the negotiator.

8. The apparatus as recited in claim 7, said third party negotiator being selected from the group consisting of a judge, a plurality of jurors, an arbitrator, and a plurality of users of the complaint handling computer means.

9. The apparatus as recited in claim 7, said receiving means being operable for receiving complaints from a plurality of complainants against a plurality of subjects and a plurality of responses to said complaints from the subjects, said storing means being operable for storing said complaints and responses in a plurality of data records, and said negotiating means being operable for negotiating settlements for each of said complaints and responses and for storing said settlements in said data records in association with the respective complaints and responses.

10. The apparatus as recited in claim 9, said negotiating means including:
    accessing means for accessing a plurality of other previously stored data records;
    comparing means for comparing said data record with said other data records;
    identifying means for identifying characteristics of said previously stored data records that are similar to the complaint and response in said data record; and
    creating means for creating a judgment for said complaint and response based on the previous judgments in the identified data records.

11. A complaint handling computer apparatus for handling user complaints from complainants against subjects, said apparatus comprising:

receiving means for receiving a complaint from a complainant against a subject and a response to said complaint from the subject;

negotiating means for negotiating a settlement of said complaint;

storing means for storing said complaint, response, and settlement in a data record;

accessing means for allowing persons other than the complainant and the subject to access the data record to review said complaint, response, and settlement;

monitoring means for monitoring the complainant's and the subject's performance; and rating means responsive to the monitoring means for rating the complaint's and the subject's performance for use in negotiating the settlement to the complaint.

12. The apparatus as recited in claim 7, further including an access terminal coupled with said receiving means.

13. The apparatus as recited in claim 12, wherein said access terminal is coupled with said receiving means by a telecommunications network.

14. A method of handling user complaints against subjects comprising the steps of:

receiving into a complaint handling computer means a complaint from a complainant against a subject and storing said complaint in a data record;

receiving into said complaint handling computer means a response to said complaint from the subject and storing said response in said data record; and negotiating a settlement of said complaint with said complaint handling computer means; said negotiating step including the steps of:

selecting a third party negotiator;

allowing the negotiator to access the data record in the complaint handing computer means to retrieve and review the contents of the data record;

receiving into said complaint handling computer means a judgment of the complaint rendered by the negotiator; and storing said judgment in said data record in association with said complaint and response.

15. The method as recited in claim 14, said third party negotiator being selected from the group consisting of a judge, a plurality of jurors, an arbitrator, and a plurality of users of the complaint handling computer means.

16. A method of handling user complaints against subjects comprising the steps of:

receiving into a complaint handling computer means a complaint from a complainant against a subject and storing said complaint in a data record;

receiving into said complaint handling computer means a response to said complaint from the subject and storing said response in said data record; and negotiating a settlement of said complaint with said complaint handling computer means;

the complaint handling computer means including access means for accessing a plurality of other data records each including a previously filed complaint, a response to the previously filed complaint, and a judgment resolving the previously filed complaint, said negotiating step including the steps of:

accessing said other data records;

comparing in said complaint handling computer means said data record with said other data records;

identifying characteristics of said previously filed complaints and responses in said other data records that are similar to the complaint and response in said data record; and creating with the complaint handling computer means a judgment for said complaint and response based on the previous judgments in the other data records that including complaints and responses with similar characteristics to the complaint and response in said data record.

17. A method of handling user complaints against subjects comprising the steps of:

receiving into a complaint handling computer means a complaint from a complainant against a subject and storing said complaint in a data record;

receiving into said complaint handling computer means a response to said complaint from the subject and storing said response in said data record; and negotiating a settlement of said complaint with said complaint handling computer means;

monitoring the complainant's and the subject's performance; and rating the complainant's and the subject's performance for use in negotiating the settlement to the complaint.

18. A computer program stored on a computer-readable memory device for directing a computer to handle user complaints against subjects, said computer program comprising:

receiving means for receiving a complaint from a complainant against a subject and a response to said complaint from the subject;

storing means for storing said complaint and response in a data record;

negotiating means for directing the computer to negotiate a settlement of said complaint, said negotiating means including means for creating a judgment for said complaint by accessing external data unrelated to said complaint and said response.

19. The computer program as recited in claim 18, said external data including data related to other complaints and responses.

* * * * *